Oct. 15, 1957  W. J. HASSELBERG  2,809,883
GAS TESTING DEVICE
Filed Dec. 22, 1955
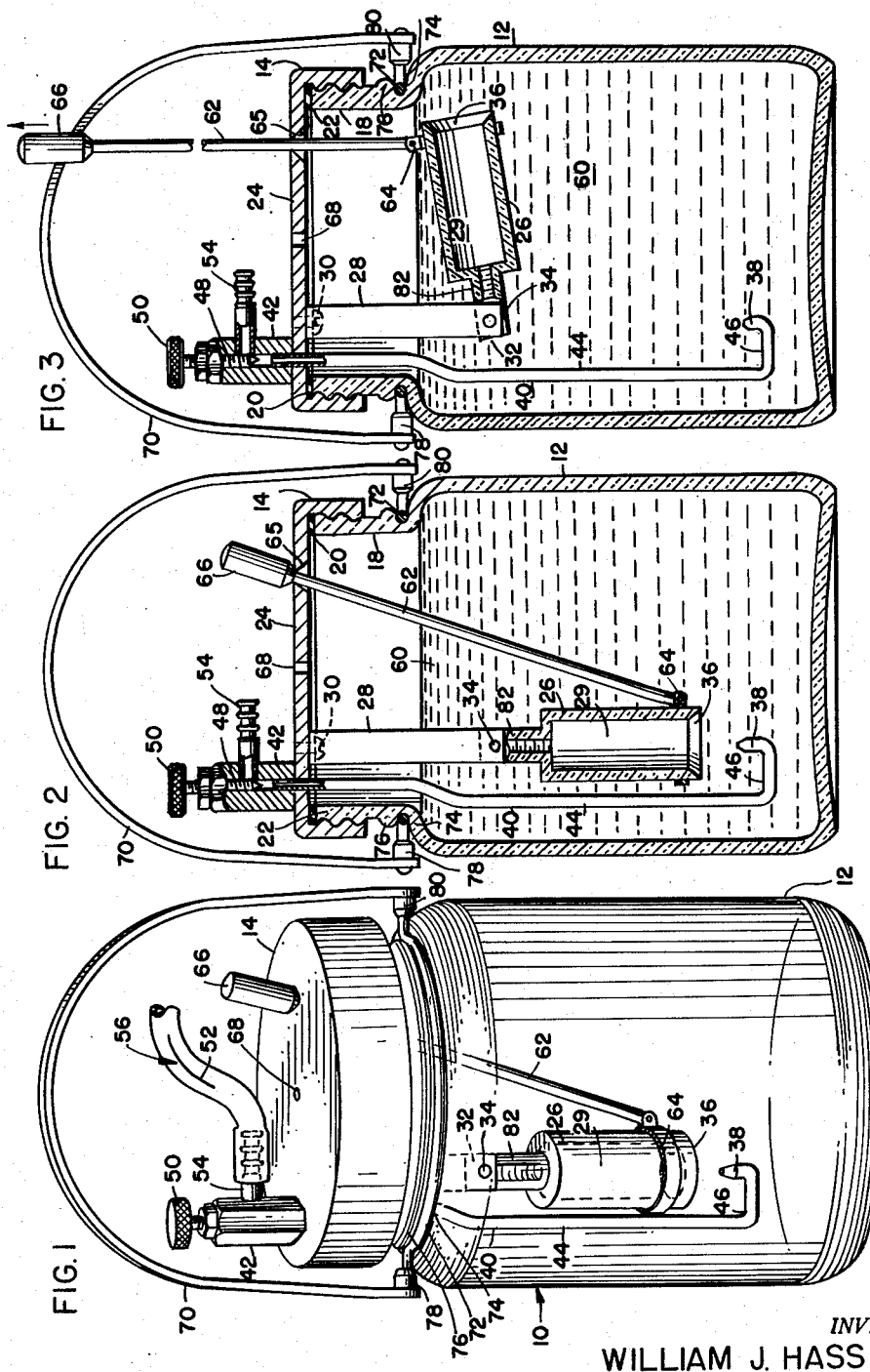
INVENTOR:
WILLIAM J. HASSELBERG
BY
ATT'YS

2,809,883
GAS TESTING DEVICE

William J. Hasselberg, Forest Park, Ill.

Application December 22, 1955, Serial No. 554,740

6 Claims. (Cl. 23—254)

This invention relates to apparatus for testing the percentage of impurities in a gas, and more particularly to an improved tester for $CO_2$ which is safe, compact and easy to operate.

Testing equipment heretofore available for determining the purity of $CO_2$ has been constructed with chambers of blown glass and fitted with glass cocks and valves. Not only is such equipment very expensive and fragile, but it necessitates filling and emptying the respective chambers with a solution of sodium hydroxide. This liquid is both poisonous and extremely caustic, so that the multiple handling steps required create a hazard to the operator every time a test is made. Also, the skilled labor which must be used with such equipment constitutes a considerable expense, particularly where the tests are made regularly, as in testing the purity of $CO_2$ to be collected from fermenting tanks for use in carbonating beer or other beverages.

It is accordingly an object of the present invention to provide apparatus for testing $CO_2$ which eliminates all fragile glass parts, such as the blown glass and three-way glass cocks heretofore required.

Another object is to provide apparatus wherein the testing apparatus is mounted in a single container which holds the caustic soda, so that the operator is no longer required to handle the solution.

Another object of the invention is to provide apparatus of the type indicated wherein the container may be a jar of standard size, such as the glass jars used commercially in packing vegetables or applesauce, so that this item can be readily replaced at very little expense.

Another object is to provide an apparatus and method which can be used quickly and accurately in testing $CO_2$ without necessitating special training or experience. In currently available apparatus, it is generally necessary to pour caustic soda into one blown glass chamber, introduce this fluid into a second chamber by means of a multiple valve system, evacuate the fluid from the second chamber and reintroduce it into the first chamber by means of further valve adjustments, at the same time admitting $CO_2$ into the second chamber, and finally causing the fluid to enter the second chamber for a second time. These steps have been necessary in order to insure a full supply of gas to be tested in a test chamber and then to test the impurities therein by permitting the sodium hydroxide solution to rise in the test chamber until it has selectively absorbed all of the $CO_2$. The same result can be accomplished with the apparatus of the present invention without any metering of caustic soda from one vessel to another.

Another object of the invention is to provide an apparatus of the type indicated which can be made ready for use or reuse by pivoting a test vessel in the container, when the container is filled with the gas-selective fluid to a predetermined level, so that all gases are evacuated from the test vessel.

Another object of the invention is to provide a control means for the test vessel whereby the vessel may be manually pivoted upwardly to an evacuating position and then released to a depending vertical position for introduction therein of the gas to be tested.

Another object of the invention is provision of gas conduit means for introducing gas into the test vessel in its vertical depending position, together with a simple metal valve shut-off means for starting and stopping the flow of gas into the vessel.

Another object is provision of pressure relief means for a flexible portion of the conduit outside the container comprising a slit of predetermined length in the flexible portion, so that no extra structure is required and operation is uniform and automatic.

Another object is provision of cover means for the container adapted to afford a guide for the control means for the test vessel and to pivotally support the vessel.

Other objects and advantages of the invention will become apparent as the description proceeds in accordance with the drawings, in which:

Fig. 1 is a perspective view of the testing apparatus according to the invention;

Fig. 2 is a vertical sectional view showing the apparatus in position for receiving a charge of gas to be tested; and Fig. 3 is a vertical sectional view showing the apparatus being prepared for reuse.

Referring now to Figs. 1, 2 and 3, the testing apparatus 10 comprises a standard glass container 12, such as is used commercially for packing vegetables and the like for grocery store sale, and a cast metal cap 14 which is threadedly received on the mouth 18 of the glass with an annular seal 20 between the upper rim 22 of the glass and the cover 24 of the cap 14.

In order that a standard volume of gas may be used in each test, a testing tube 26 is pivotally mounted in a pair of depending brackets 28 which are secured to the closure 24 by any suitable means such as the bolt 30. The upper or closed end 32 of the tube may be solid in order to permit a pivot pin 34 to be received therethrough, and in its normal position, the tube 26 depends vertically within the container so that the open end 36 of the tube is in register with a nozzle 38 of a conduit 40. The conduit 40 is fixedly received through the top wall 24 of the cover and within a valve post 42, the depending length 44 of the conduit extending in spaced relation to the tube 26 a distance such that the transverse section 46 will be substantially below the tube and nozzle 38 will be in proximate relation to the tube to permit pivotal movement thereof. A needle valve 48 is threadedly secured in the post 42 and is provided with a knurled handle 50 for metering a desired quantity of gas into the conduit. Gas enters conduit 40 from a flexible conduit 52 attached to a connection 54 on fitting 42. Conduit 52, which may be of rubber or other suitable material leads to a fermenter or other gas source and in order that the pressure of the gas may not exceed a predetermined desirable limit the hose 52 is slit axially for a predetermined distance, such as half an inch, to provide an automatic and uniformly operating pressure valve 56.

The glass jar 12 contains a solution 60 of sodium hydroxide of about 15% concentration, the level of which extends substantially above the pivot 34 for testing tube 26. When it is desired to evacuate gases which may be retained in the testing tube and to fill the tube completely with the caustic soda solution, a pull rod 62 is used which is fastened to the lower end of the tube by an annular pivot bracket 64 and extends upwardly through an aperture 65 in the top wall 24. The upper end of the rod may be provided with a handle 66 which also serves as a stop, so that when the tube is lowered after being completely filled with the solution it will be automatically held in the vertical position. A vent 68 is defined in the cover 24 so that the gases emanating from the solution upon evacuation of tube 26 or otherwise may be vented to the outside atmosphere.

It will be appreciated that the compactness of the unit described permits its use in a number of locations, whereas previously available assemblies were limited to use at a given site for the most part, due to their fragile and cumbersome construction. For the purpose of carrying the jar 12 from place to place, a bail 70 its pivotally secured to the jar by means of annular bracket 72 held between the shoulder 74 of the container and an annular boss 76, the bracket having trunnions 78 and 80 integrally formed therewith and receiving the ends of the bail.

It is necessary in using the carbon dioxide manufactured from fermenting vats or the like to obtain a gas having a predetermined standard of purity. This may be as much as 2% impurity but it is preferred that a 1% critical level be maintained. In order to determine whether this level has been exceeded and also for the purpose of selling the carbon dioxide as being of a specific grade, for example .006 impurity, a reduced portion or neck 82 of the tube 26, which has a volumetric capacity equal to a predetermined part of the total volume of the tube 26, for example 1%, is graduated into ten equal axially spaced indicia each, for example, representing .10 of 1% of the volumetric capacity within the test chamber 29. The fact that the upper portion 82 of the tube 26 is of reduced cross section makes it easier to read this calibrated scale because the displacement between the respective markers will be greater than if they were formed on only 1% of the total length of the tube. Since the caustic soda solution 60 is selective and absorbs only the specific gas $CO_2$ it is thus possible to obtain an extremely accurate reading of the percentage of impurities in the gas being tested.

In operation, the open end 36 of the tube 26 is first swingably lifted upwardly slightly above the pivot 34 so that all the gases may escape to be vented into the atmosphere. Thus the interior of the tube will become completely filled with the caustic soda solution and when the tube is swung downwardly by means of the pull rod 62 into aligned relation with the nozzle 38, the solution will be in contact with both the internal and external surfaces of the tube. Thereupon gas is introduced under pressure into tube 26 through the conduit 40 and as it fills the tube it displaces momentarily the caustic solution therein. After the caustic solution has been completely displaced from the tube 26, the supply of gas is shut off by closing the needle valve 48 and thereupon the solution begins to absorb the gas until all of the $CO_2$ within the tube has been taken up completely. If any impurities are in the gas, such as air or the like, a pocket or gap will be formed between the top of the solution and the top of the tube. By reference to the indicia on the tube, a precise reading for the amount of impurity within the gas can be obtained. It is only necessary to wait for about a minute until the $CO_2$ has been completely absorbed.

To reuse the apparatus all that is required is to tilt the tube upwardly once again above the level of the pivot point by means of the pull rod 62 and let it drop into the vertical position shown in Fig. 2. Upon connecting the hose 52 and opening the valve 48 the entire process may be started again. There has thus been provided a testing apparatus which is extremely simple and rugged in its construction and is easy to operate so that even unskilled operators can use it. Accordingly, the range of applications of the device has been greatly increased and substantial economies have been effected.

It will be apparent that this invention may be embodied in devices which differ in many respects in detail from the particular embodiment disclosed herein. All modifications which do not go beyond the scope of the invention will readily suggest themselves to those skilled in the art. It is, therefore, not intended that the invention be limited to the exact construction shown and described, but only to the inventive concept as defined in the appended claims:

I claim:

1. A device for testing impurities in a particular gas comprising, a container adapted for filling to a predetermined level with a fluid for selectively absorbing the particular gas, an open-bottom closed-top tube pivoted in the container on an axis below the predetermined fluid level to permit swinging of the tube between a vertical position with the open tube end downwardly disposed for receiving a charge of the particular gas and a slightly above-horizontal position with the open tube end upwardly inclined to permit the container fluid to fill the tube to displace any residuent of the particular gas previously injected into the tube, a conduit for introducing into the container from an exterior source the particular gas, the outlet of the conduit being positioned within the container slightly below the open end of the vertically-positioned tube to inject the gas into the tube, and means for swinging the tube on its pivot between the aforesaid vertical and above-horizontal positions.

2. A device for testing impurities in a particular gas comprising, a container adapted for filling to a predetermined level with a fluid for selectively absorbing the particular gas, an open-bottom closed-top tube pivoted in the container on an axis below the predetermined fluid level to permit swinging of the tube between a vertical position with the open tube end downwardly disposed for receiving a charge of the particular gas and a slightly above-horizontal position with the open tube end upwardly inclined to permit the container fluid to fill the tube to displace any residuent of the particular gas previously injected into the tube, a conduit for introducing into the container from an exterior source the particular gas, the outlet of the conduit being positioned within the container slightly below the open end of the vertically-positioned tube to inject the gas into the tube, and means for swinging the tube on its pivot between the aforesaid vertical and above-horizontal positions, the closed end of the tube being of reduced diameter and bearing graduated indicia thereon for indicating the percentage of impurities in the particular gas being tested in accordance with the volume of such impurities remaining in the closed end of the tube after the tube has been completely filled with the particular gas and the testing fluid has absorbed all but the impurities.

3. A device for testing impurities in a particular gas comprising, a container adapted for filling to a predetermined level with a fluid for selectively absorbing the particular gas, an open-bottom closed-top tube pivoted in the container on an axis below the predetermined fluid level to permit swinging of the tube between a vertical position with the open tube end downwardly disposed for receiving a charge of the particular gas and a slightly above-horizontal position with the open tube end upwardly inclined to permit the container fluid to fill the tube to displace any residuent of the particular gas previously injected into the tube, a conduit for introducing into the container from an exterior source the particular gas, the outlet of the conduit being positioned within the container slightly below the open end of the vertically-positioned tube to inject the gas into the tube, and a control rod extending into the container from the exterior thereof and being movable relative to the container, the rod being hinged to the lower end of the tube whereby the movement of the rod relative to the container permits the swinging of the tube on its pivot between the aforesaid vertical and above-horizontal positions.

4. A device for testing impurities in a particular gas comprising, an open-top container adapted for filling to a predetermined level with a fluid for selectively absorbing the particular gas, a removable cover for the open-top container, an open-bottom closed-top tube suspended from the cover on a pivot below the predetermined level of fluid in the container, the tube being swingable between a vertical position with the open tube end downwardly disposed for receiving a charge of the particular gas and a slightly above-horizontal position with the open tube end upwardly inclined to permit the container fluid to fill the tube and displace any residuent of the particular gas injected into the tube, an exteriorly-extending conduit fixed on the cover and extending into the container with its discharge end upwardly disposed in axial alinement with and slightly below the open tube end in its vertical position to inject the particular gas into the tube, and a control rod slidably fulcrumed on the cover and hinged at its lower end to the lower end of the tube to permit the swinging of the tube between the aforesaid vertical and above-horizontal positions.

5. A device for testing impurities in a particular gas comprising, a container formed of transparent material and adapted for filling to a predetermined level with a fluid for selectively absorbing the particular gas, an open-bottom closed-top tube formed of transparent material and pivoted in the container on an axis below the predetermined fluid level to permit swinging of the tube between a vertical position with the open tube end downwardly disposed for receiving a charge of the particular gas and a slightly above-horizontal position with the open tube end upwardly inclined to permit the container fluid to fill the tube to displace any residuent of the particular gas previously injected into the tube, a conduit for introducing into the container from an exterior source the particular gas, the outlet of the conduit being positioned within the container slightly below the open end of the vertically-positioned tube to inject the gas into the tube, and means for swinging the tube on its pivot between the aforesaid vertical and above-horizontal positions.

6. A device for testing impurities in a particular gas comprising, an open-top container formed of transparent material and adapted for filling to a predetermined level with a fluid for selectively absorbing the particular gas, a removable cover for the open-top container, an open-bottom closed-top tube formed of transparent material and suspended from the cover on a pivot below the predetermined level of fluid in the container, the tube being swingable between a vertical position with the open tube end downwardly disposed for receiving a charge of the particular gas and a slightly above-horizontal position with the open tube end upwardly inclined to permit the container fluid to fill the tube and displace any residuent of the particular gas injected into the tube, an exteriorly-extending conduit fixed on the cover and extending into the container with its discharge end upwardly disposed in axial alinement with and slightly below the open tube end in its vertical position to inject the particular gas into the tube, and a control rod slidably fulcrumed on the cover and hinged at its lower end to the lower end of the tube to permit the swinging of the tube between the aforesaid vertical and above-horizontal positions.

References Cited in the file of this patent

FOREIGN PATENTS

| | | |
|---|---|---|
| 204,542 | Great Britain | Oct. 5, 1923 |
| 250,248 | Great Britain | Nov. 4, 1926 |
| 601,018 | Great Britain | Apr. 26, 1948 |
| 705,174 | Great Britain | Mar. 10, 1954 |